United States Patent
Tao et al.

(10) Patent No.: US 8,893,309 B2
(45) Date of Patent: Nov. 18, 2014

(54) SCANNING TUNNELING MICROSCOPE ASSEMBLY, REACTOR, AND SYSTEM

(75) Inventors: Feng Tao, Albany, CA (US); Miquel Salmeron, Emeryville, CA (US); Gabor A. Somorjai, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 227 days.

(21) Appl. No.: 13/388,223

(22) PCT Filed: Jun. 22, 2010

(86) PCT No.: PCT/US2010/039506
§ 371 (c)(1),
(2), (4) Date: Jun. 8, 2012

(87) PCT Pub. No.: WO2011/014315
PCT Pub. Date: Feb. 3, 2011

(65) Prior Publication Data
US 2012/0244038 A1 Sep. 27, 2012

Related U.S. Application Data

(60) Provisional application No. 61/230,607, filed on Jul. 31, 2009.

(51) Int. Cl.
| | |
|---|---|
| *G01Q 60/10* | (2010.01) |
| *G01Q 30/18* | (2010.01) |
| *G01Q 30/16* | (2010.01) |
| *G01Q 60/16* | (2010.01) |
| *G01Q 30/12* | (2010.01) |
| *G01Q 60/00* | (2010.01) |
| *G21K 5/10* | (2006.01) |
| *B82Y 35/00* | (2011.01) |

(52) U.S. Cl.
CPC .............. *G01Q 60/16* (2013.01); *G01Q 30/16* (2013.01); *B82Y 35/00* (2013.01); *G01Q 30/12* (2013.01); *Y10S 977/86* (2013.01); *Y10S 977/861* (2013.01); *Y10S 977/869* (2013.01); *Y10S 977/871* (2013.01)
USPC .................. 850/26; 850/17; 850/18; 850/21; 250/442.11; 422/82.05; 977/860; 977/861; 977/869; 977/871

(58) Field of Classification Search
None
See application file for complete search history.

(56) References Cited

U.S. PATENT DOCUMENTS

| | | | | |
|---|---|---|---|---|
| 4,103,168 | A | * | 7/1978 | Sturrock et al. ......... 250/442.11 |
| 5,097,545 | A | * | 3/1992 | Hooi ................................ 5/104 |

(Continued)

OTHER PUBLICATIONS

International Search Report and Written Opinion for International Application No. PCT/US2010/039506 mailed Sep. 1, 2010.

(Continued)

*Primary Examiner* — Neil N Turk
(74) *Attorney, Agent, or Firm* — Lawrence Berkeley National Laboratory

(57) ABSTRACT

An embodiment of a scanning tunneling microscope (STM) reactor includes a pressure vessel, an STM assembly, and three spring coupling objects. The pressure vessel includes a sealable port, an interior, and an exterior. An embodiment of an STM system includes a vacuum chamber, an STM reactor, and three springs. The three springs couple the STM reactor to the vacuum chamber and are operable to suspend the scanning tunneling microscope reactor within the interior of the vacuum chamber during operation of the STM reactor. An embodiment of an STM assembly includes a coarse displacement arrangement, a piezoelectric fine displacement scanning tube coupled to the coarse displacement arrangement, and a receiver. The piezoelectric fine displacement scanning tube is coupled to the coarse displacement arrangement. The receiver is coupled to the piezoelectric scanning tube and is operable to receive a tip holder, and the tip holder is operable to receive a tip.

28 Claims, 14 Drawing Sheets

(56) References Cited

U.S. PATENT DOCUMENTS 5,306,918 A * 4/1994 Goudonnet et al. ..... 250/442.11
7,414,250 B1    8/2008 Hersam
7,511,954 B2    3/2009 Tsai

OTHER PUBLICATIONS

H. Over, Y. D. Kim, A. P. Seitsonen, S. Wendt, E. Lundgren, M. Schmid, P. Varga, A. Morgante, and G. Ertl, Science 287, 1474 (2000).
H. Over and M. Muhler, Prog. Surf. Sci. 72, 3 (2003).
B. J. McIntyre, M. Salmeron, and G. A. Somorjai, Rev. Sci. Instrum. 64, 687 (1993).
J. A. Jensen, K. B. Rider, Y. Chen, M. Salmeron, and G. A. Somorjai, J. Vac. Sci. Technol. B 17, 1080 (1999).
P. B. Rasmussen, B. L. M. Hendriksen, H. Zeijlemaker, H. G. Ficke, and J. W. M. Frenken, Rev. Sci. Instrum. 69, 3879 (1998).
E. Laegsgaard, L. Osterlund, P. Thostrup, P. B. Rasmussen, I. Stensgaard, and F. Besenbacher, Rev. Sci. Instrum. 72, 3537 (2001).
A. Kolmakov and D. W. Goodman, Rev. Sci. Instrum. 74, 2444 (2003).
M. Rößler, P. Geng, and J. Wintterlin, Rev. Sci. Instrum. 76, 023705 (2005).
Feng Tao, et al., Science 322, 932 (2008).
K. Mase and Y. Murata, Surf. Sci. 277, 97 (1992).
F. Tao, et al., Nano Letters 2009 vol. 9, No. 5, 2167-2171.
Tao et al. A new scanning tunneling microscope reactor used for high-pressure and high-temperature catalysis studies. Review of Scientific Instruments 79, 084101, Aug. 1, 2008.
D.W. Blakely et al., J. Vac. Sci. Technol. 13, 1091 (1976).

* cited by examiner

SCANNING TUNNELING MICROSCOPE ASSEMBLY, REACTOR, AND SYSTEM

RELATED APPLICATIONS

This application claims priority to PCT Application PCT/US2010/039506, filed Jun. 22, 2010, which in turn claims priority to U.S. Provisional Application Ser. No. 61/230,607 filed Jul. 31, 2009, both of which applications are incorporated herein by reference as if fully set forth in their entirety.

STATEMENT OF GOVERNMENT SUPPORT

This invention was made with government support under Contract No. DE-AC02-05CH11231 awarded by the U.S. Department of Energy. The government has certain rights in this invention.

BACKGROUND OF THE INVENTION

The present invention relates to the field of microscopy and, more particularly, to the field of scanning tunneling microscopy.

The understanding of heterogeneous catalysis at a molecular level has been one of the central issues of physical chemistry for the past half century. Single crystal surfaces have served as valuable model catalysts providing insights into heterogeneous catalysis under vacuum conditions. This vacuum surface science approach of catalysis studies has revealed a tremendous amount of information for a great number of catalytic systems. However, industrial heterogeneous catalytic reactions are usually carried out at high pressure and high temperature. There are considerable experimental challenges in the high pressure studies, which are necessary in order to understand molecular behavior under realistic conditions. The potential difference in adsorption, surface structures, and catalytic mechanisms between the model studies at low pressure and industrial reactions at high pressure is often referred as pressure gap.

A key component in studying the pressure gap is to characterize the adsorbed layer of the reactant gases at high pressure during catalytic processes. A simple extrapolation of the insights into the adsorption structure obtained at low pressure and low temperature is not necessarily applicable to high pressure and high-temperature conditions which could have different energetic pathways. Thus, to obtain a complete understanding of catalysis, it is necessary to perform studies of surface catalytic reactions under high pressure of reactants.

Scanning tunneling microscope (STM) has the unique capability of studying catalyst surfaces atom by atom, which is invaluable for elucidating the adsorption structure and the mobility of reactant molecules during catalysis. This technique can be applied in a pressure range from UHV (ultra high vacuum) to atmospheric or higher pressure since the tunneling process between the sample and tip only occurs in a very close range of 5-50 Å. It has been applied to catalytic studies under a condition of relatively high pressure by a few groups (see B. J. McIntyre et al., *Rev. Sci. Instrum.* 64, 687 (1993); J. A. Jensen et al., *J. Vac. Sci. Technol.* B17, 1080 (1999); P. B. Rasmussen et al., *Rev. Sci. Instrum.* 69, 3879 (1998); E. Laegsgaard et al., *Rev. Sci. Instrum.* 72, 3537 (2001); A. Kolmakov et al., *Rev. Sci. Instrum.* 74, 2444 (2003); and M. Rößler et al., *Rev. Sci. Instrum.* 76, 023705 (2005)) since the first demonstration by McIntyre et al. High pressure studies have been performed of STM by filling reactant gases into an STM chamber connected to the UHV preparation chamber (McIntyre et al.; and Jensen et al.). However, this method has disadvantages such as large volume of reactant gases and limits in sample heating, reactant gas pressure, and spatial resolution.

SUMMARY OF THE INVENTION

Embodiments of the present invention include an STM (scanning tunneling microscope) reactor, an STM system, and an STM assembly. According to an embodiment, the scanning tunneling microscope reactor includes a pressure vessel, an STM assembly, and three spring coupling objects. The pressure vessel includes a sealable port, an interior, and an exterior. The STM assembly is coupled to the interior of the pressure vessel. The three spring coupling objects are coupled to the exterior of the pressure vessel and are operable to suspend the pressure vessel by springs.

According to an embodiment, the STM system includes a vacuum chamber, an STM reactor, and three springs. The three springs couple the STM reactor to the vacuum chamber and are operable to suspend the scanning tunneling microscope reactor within the interior of the vacuum chamber during operation of the STM reactor.

According to an embodiment, the STM assembly includes a coarse displacement arrangement, a piezoelectric scanning tube coupled to the coarse displacement arrangement, and a receiver. The piezoelectric scanning tube provides fine displacement and is coupled to the coarse displacement arrangement. The receiver is coupled to the piezoelectric scanning tube and is operable to receive a tip holder.

BRIEF DESCRIPTION OF THE DRAWINGS

The present invention is described with respect to particular exemplary embodiments thereof and reference is accordingly made to the drawings in which.

DETAILED DESCRIPTION OF THE INVENTION

Embodiments of the present invention include an STM (scanning tunneling microscope) reactor, an STM system, and an STM assembly. Inventive aspects of the embodiments of the disclosure include an STM capable of operating at high pressure, suspended inside a vacuum chamber by a spring suspension system to isolate the STM assembly from external vibration, a coarse/fine tip motion control for scanning at atomic dimensions, and means for radiant heating of a sample in the STM assembly.

A high-pressure and high-temperature reactor equipped with a high-resolution scanning tunneling microscope (STM) assembly has been designed, built, and operated for catalytic studies. In this design, the STM assembly, sample, and tip are placed in a small high pressure reactor (~15-19 cm$^3$) located within an ultrahigh vacuum (UHV) chamber. A sealable port on the wall of the reactor separates the high pressure environment in the reactor from the vacuum environment of the STM chamber and permits sample transfer and tip change in UHV. A combination of a sample transfer arm, wobble stick, and sample load-lock system allows fast transfer of samples and tips between the preparation chamber, high pressure reactor, and ambient environment. This STM reactor can work as a batch or flowing reactor at a pressure range of 10$^{-13}$ to several bars and a temperature range of 300°-700° K. Experiments performed on two samples both in vacuum and in high pressure conditions demonstrate the capability of in situ investigations of heterogeneous catalysis and surface chemistry at atomic resolution at a wide pressure range from UHV to a pressure higher than 1 atm.

The high pressure and high-temperature reactor S™ and UHV system described here overcome limitations of prior systems and allows for catalytic studies under a wide range of pressure (from 10$^{-13}$ to several bars, possibly as high as 20 or more bars) and temperature (from 300° to 700° K.). The high pressure reactor is a small cylinder chamber with a volume of approximately 19 cm$^3$, placed inside the vacuum environment of the UHV chamber by a special docking scaffold and mounting framework. It is vibration isolated from the UHV chamber with three springs, offering the capability of imaging surface with atomic resolution. The sample can be heated in situ to 700° K. by an external heating lamp installed under the high pressure reactor in the STM chamber. Both the sample and tip can be conveniently placed and transferred using a transfer arm and wobble stick.

Details of the high pressure and high-temperature STM system are presented. The STM system includes sample preparation chamber, STM chamber, and sample/tip loading system. Sample preparation and STM chambers, high pressure reactor and gas introduction system, STM assembly and sample heating, and sample transfer and tip change are discussed in Sections II A-II D, respectively.

Figure 1:
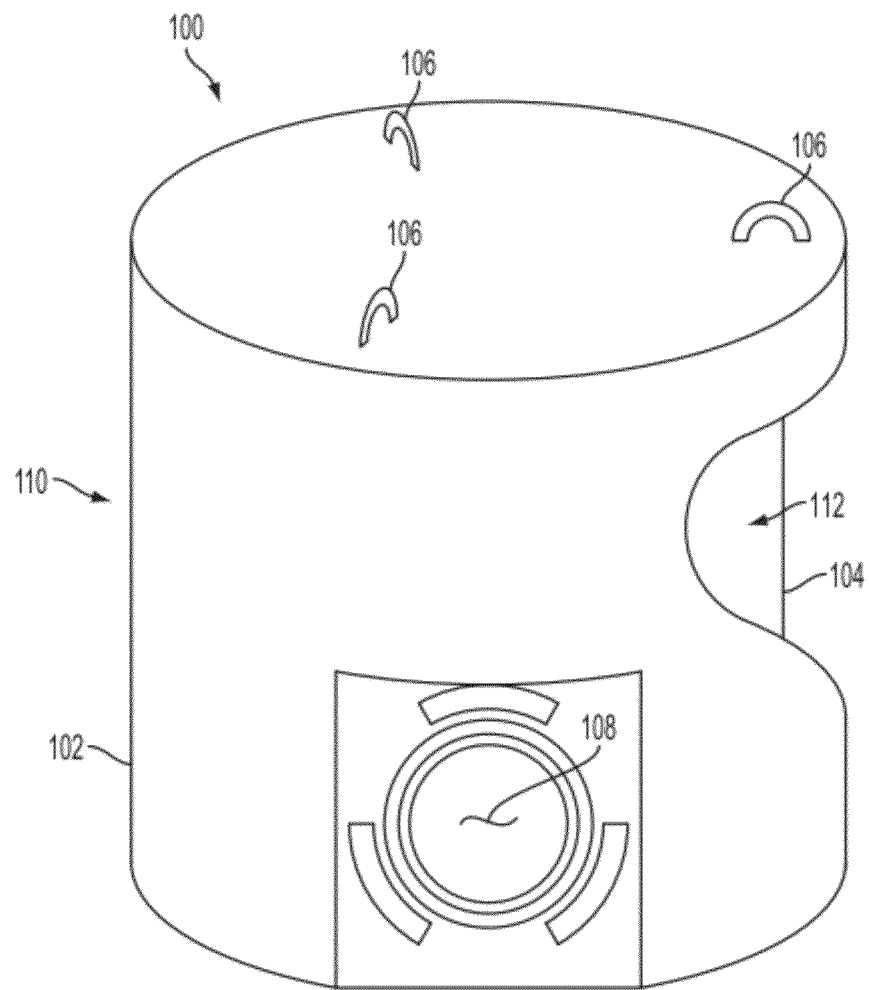
FIG. 1 illustrates an embodiment of an STM (scanning tunneling microscope) reactor of the present disclosure.

An embodiment of an STM reactor of the present invention is illustrated in FIG. 1. The STM reactor 100 includes a pressure vessel 102, an STM assembly 104, and three spring coupling objects 106. The pressure vessel 102 includes a sealable port 108, an exterior 110, and an annular interior space 112. The STM assembly 104 is coupled to the annular interior space 112 of the pressure vessel 102. It is noted that in FIG. 1a portion of the pressure vessel 102 is cut-away to show the STM assembly 104 and the annular interior space 112. The three spring coupling objects 106 couple to the exterior 110 of the pressure vessel 102 and are operable to suspend the STM reactor 100 by springs (not shown), which provides vibration isolation of the STM reactor 100 during operation. The three spring coupling objects 106 are selected from the group of eyes, hooks, loops, and other suitable spring coupling objects. According to an embodiment, a free volume of the annular interior space 112 of the pressure vessel 102 with the STM assembly 104 installed is less than about 100 cm$^3$. According to another embodiment, the free volume of the annular interior space 112 of the pressure vessel 102 with the STM assembly 104 installed is less than about 50 cm$^3$. According to yet another embodiment, the free volume of the annular interior space 112 of the pressure vessel 102 with the STM assembly 104 installed is less than about 30 cm$^3$. In an embodiment, the sealable port 108 is sealed using a bayonet seal (not shown). In another embodiment, another suitable sealing technique is used to seat the sealable port 108. The STM reactor 100 may be employed for scanning tunneling microscopy studies over the pressure range of 10$^{-13}$ to ~20 Bar and over the temperature range of ~300 to ~700° C.

Figure 2:
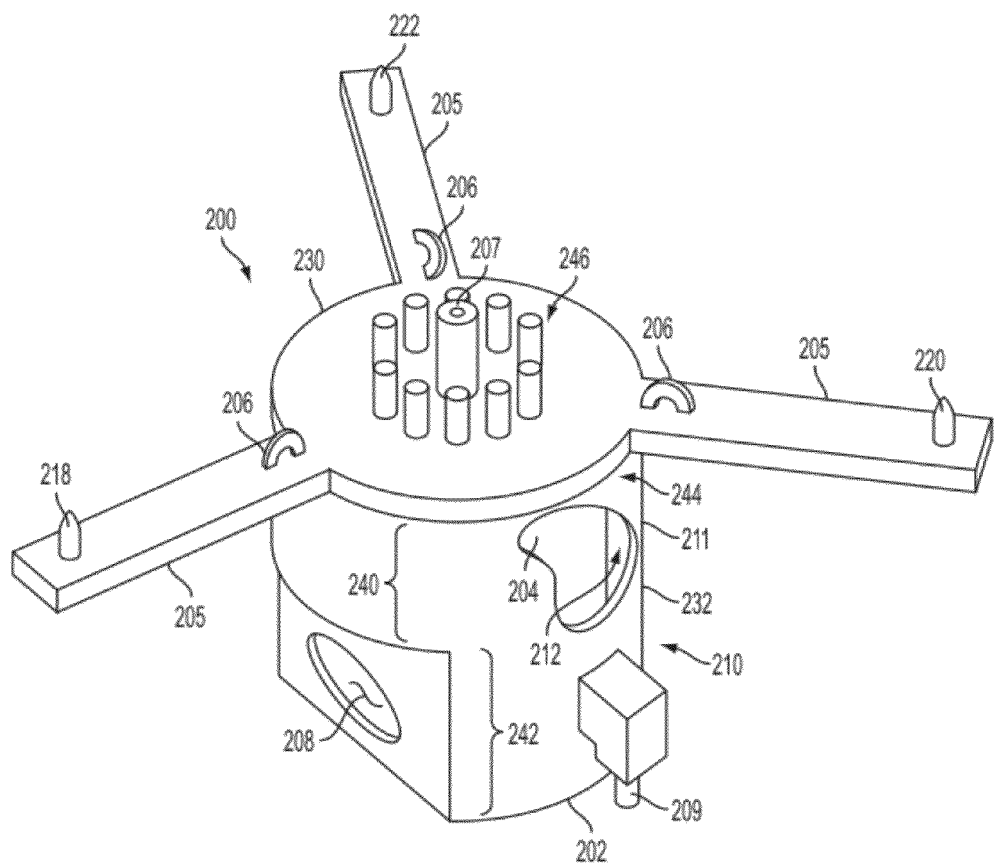
FIG. 2 illustrates another embodiment of an STM reactor of the present disclosure.

Another embodiment of an STM reactor of the present invention is illustrated in FIG. 2. The STM reactor 200 includes a pressure vessel 202, an STM assembly 204, three arms 205, three spring coupling objects 206, and gas inlet and outlet ports, 207 and 209. The pressure vessel 202 includes a sealable port 208, an exterior 210, and an interior 212. According to an embodiment, the pressure vessel 202 comprises a cylindrical body 211 and the sealable port 208 is located in the cylindrical body 211 proximal to a bottom of the cylindrical body 211. The sealable port 208 includes an o-ring (not shown). The STM assembly 204 is coupled to the interior of the pressure vessel 202. It is noted that in FIG. 2 a portion of the pressure vessel is cut-away to reveal the STM assembly 204 and the interior 212. The three arms 205 couple the three spring coupling objects 206 to the exterior 210 of the pressure vessel 202. The three spring coupling objects 206 are operable to couple to three springs (not shown) that suspend the STM reactor 200 during operation of the reactor 200. First and second alignment pins, 218 and 220, couple to two of the three arms 205 and are operable to mate with a mounting framework (not shown). A third pin 222 may couple to a remaining arm of the three arms 205 and may also be operable to mate with the mounting framework. Gas inlet and outlet ports, 207 and 209, are operable to provide a gas or gases (e.g., a reactant gas or gases) flowing into and/or through the STM reactor 200 during operation. The STM reactor 200 may be employed for scanning tunneling microscopy studies of catalysis reactions using the gas or gases in batch or flowing modes.

Figure 3:
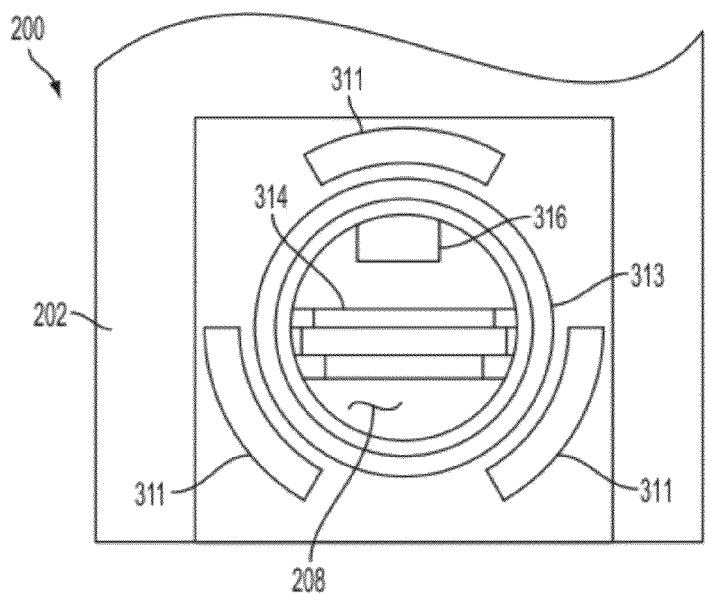
FIG. 3 illustrates an embodiment of a portion of an STM reactor of the present disclosure.

A portion of the STM reactor 200 is further illustrated in FIG. 3. The STM reactor 200 includes the pressure vessel 202, which includes the sealable port 208. A stage 314, which is coupled to the interior 212 of the pressure vessel 202 by way of the STM assembly 204, is operable to receive a sample holder (not shown) by way of the sealable port 208. A receiver 316 of the STM assembly 204 is operable to receive a tip holder (not shown) also by way of the sealable port 208. Lugs 311 engage a bayonet seal that forms a seal with an o-ring 313.

Figure 4:
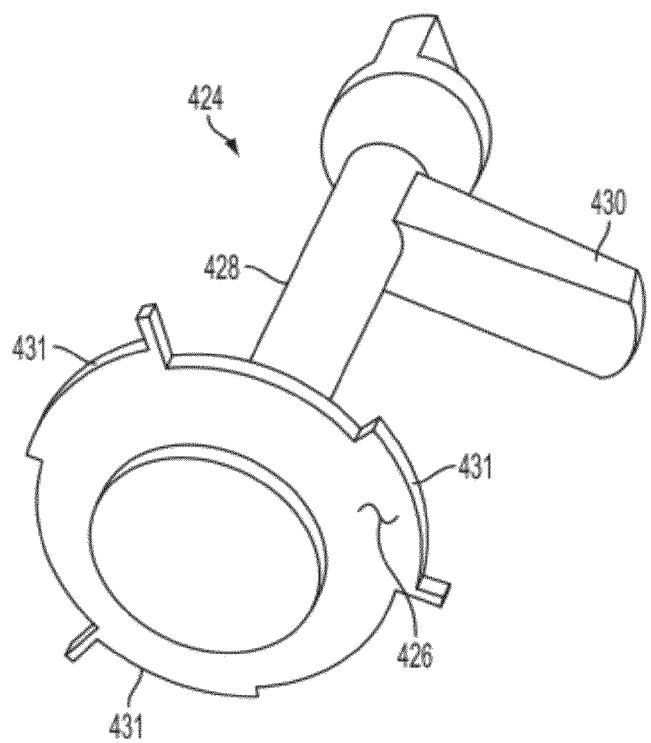
FIG. 4 illustrates a bayonet seal which seals a seal port of an STM reactor in accordance with an embodiment of the present disclosure.

An embodiment of the bayonet seal that is operable to engage with the sealable port 208 is illustrated in FIG. 4. The bayonet seal 424 includes a seal surface 426, a shaft 428, a lever arm 430, and seal surface protrusions 431. In operation, the seal surface 426 of the bayonet seal 424 mates with the o-ring 313 of the sealable port 208 (FIG. 3) and the lever arm 430 is used to rotate the seal surface 426, which engages the seal surface protrusions 431 with the lugs 311 to seal the pressure vessel 202, which allows the STM reactor 200 to be pressurized.

Figure 5:
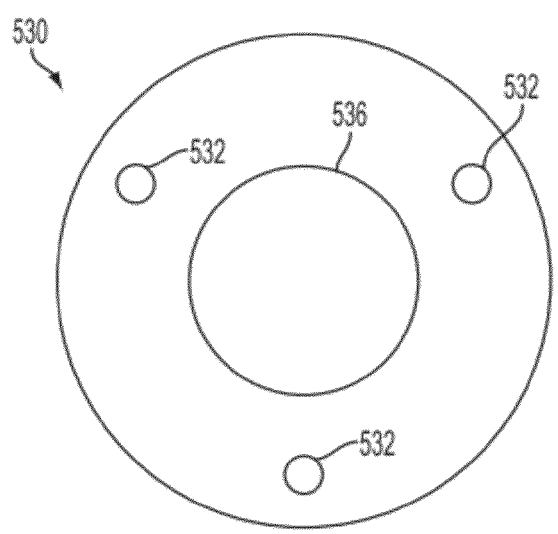
FIG. 5 illustrates a bottom of an STM reactor of the present disclosure.

An embodiment of a bottom 530 of the STM reactor 200 is illustrated in FIG. 5. The bottom 530 of the reactor 200 includes alignment holes 532 and a window 536. In an embodiment, the bottom 530 of the STM reactor 200 includes three alignment holes 532. In another embodiment, the bottom 530 of the reactor 200 has two alignment holes. The window 536 is operable to transmit radiant heat to a sample assembly (not shown).

The alignment holes 532 are operable to mate with a docking scaffold (not shown). The docking scaffold is operable to raise the STM reactor 200 so that the alignment pins, 218 and 220 (FIG. 2), engage with the mounting framework, which securely positions the reactor 200 (a) for sample insertion, sample removal, and tip exchange, (b) for allowing a sample transfer arm to pass below the reactor 200, and (c) for positioning the reactor 200 for easy access by a wobble stick (not shown). The docking scaffold is further operable to lower the STM reactor 200 and disengage with the reactor 200 so that the reactor 200 is suspended by the three springs for scanning tunneling microscopy experiments.

Figure 6:
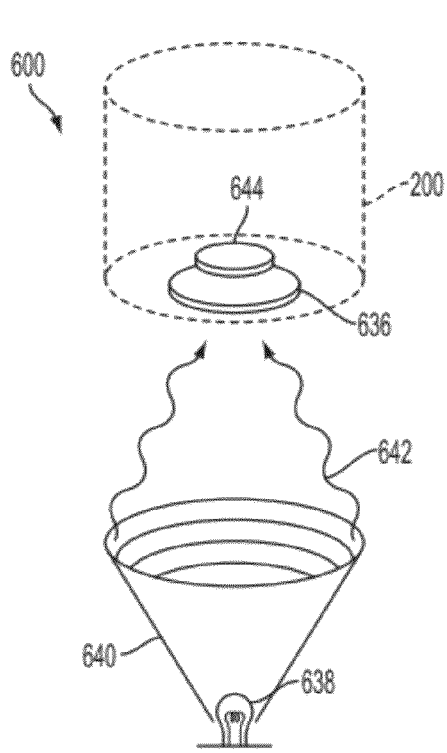
FIG. 6 illustrates a radiant heating system of the present disclosure.

An embodiment of a radiant heating system of the present invention is illustrated in FIG. 6. The radiant heating system 600 includes a light source 638 (e.g., a halogen lamp), an elliptical reflector 640, and the window 636. In operation, the elliptical reflector 640 forms an optical axis for light 642 emitted by the light source 638 and focuses the light 642 onto a sample 644 through the window 636. The light 642 radiantly heats the sample assembly 644. In an embodiment, the radiant heating system 600 is operable to heat the sample assembly to 700° C.

According to an embodiment, the pressure vessel 202 of the STM reactor 200 (FIG. 2) includes a lid 230 and pressure vessel body 232. The pressure vessel body 232 comprises an upper body portion 240, a lower body portion 242 and a vessel neck 244 (not visible in FIG. 2) that mates to the lid 230. According to an embodiment, the lid 230 comprises a plurality of pin-sockets 246, which provide electrical connections to the scanning tunneling microscope body 204. In an embodiment, the STM assembly 204 is coupled to the interior 212 of the pressure vessel 202 by way of the pin-sockets 246.

Figure 7:
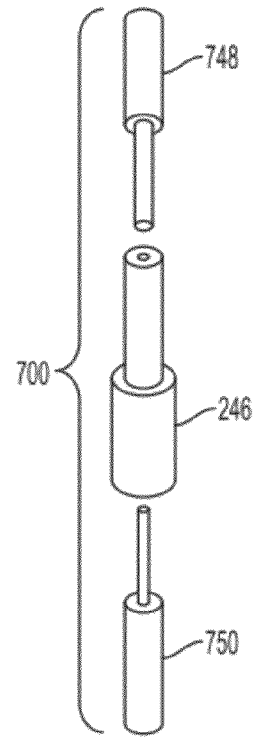
FIG. 7 illustrates a pin-socket assembly which provides an electrical connection through a lid of an STM reactor in accordance with an embodiment of the present disclosure.

An embodiment of a pin-socket assembly of the present invention is illustrated in FIG. 7. The pin-socket assembly 700 includes a pin-socket 246, an external pin 748 and internal pin 750. The pin-socket 246 provides an electrical interface between vacuum on the outside of the STM reactor 200 and the interior of the reactor 200, which may be under high pressure. The pin-socket 246 is operable to mate with the external pin 748, which is operable to provide an external electrical connection, and to also mate with the internal pin 750, which provides an electrical connection to the STM assembly 204 (FIG. 2) within the pressure vessel 202.

Figure 8:
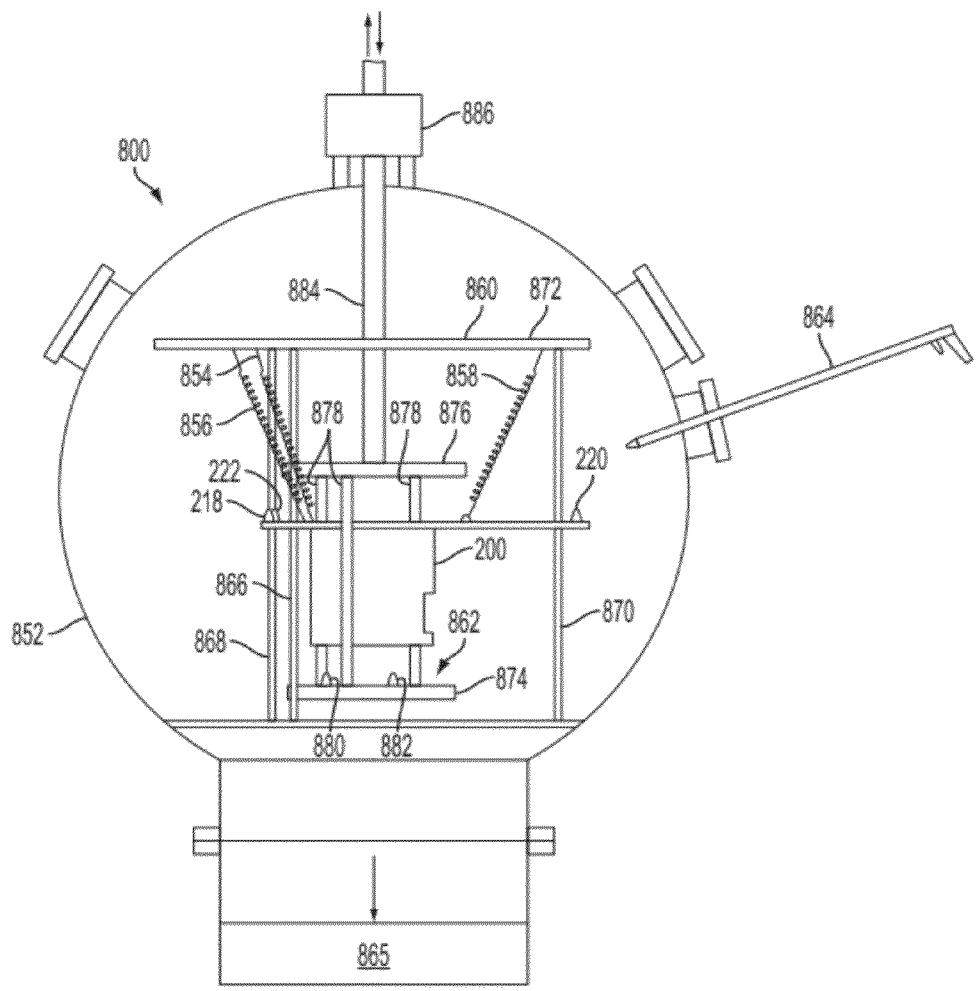
FIG. 8 illustrates an embodiment of an STM system of the present disclosure.

An embodiment of an STM system of the present invention is illustrated in FIG. 8. The STM system 800 includes a vacuum chamber 852, the STM reactor 200, three springs, 854, 856, and 858, a mounting framework 860, a docking scaffold 862, a wobble stick 864, and a UHV pumping system 865. The mounting framework 860 includes mounting frame rods, 866, 868, and 870, which support a mounting frame ring 872. The three springs, 854 . . . 858, couple the STM reactor 200 to the mounting frame ring 872 or to the three mounting frame rods, 866, 868, and 870, respectively. The three springs, 854 . . . 858 suspend the STM reactor 200 within the interior of the vacuum chamber 852 during operation of the reactor 200. Suspending the STM reactor 200 by the three springs, 854 . . . 858, isolates the reactor 200 from vibrations that would otherwise impair scanning tunneling microscopy studies performed within the reactor 200. The docking scaffold includes a lower plate 874, an upper plate 876, docking scaffold rods 878, alignment pins 880 and 882, and a docking scaffold shaft 884. The lower plate 874 is coupled to the upper plate 876 by the docking scaffold rods 878. The lower plate 874 includes the alignment pins, 880 and 882. The docking scaffold shaft 884 couples to the upper plate 876 and to a drive mechanism 886. In operation, the drive mechanism 886 raises the docking scaffold 862 causing the alignment pins 880, 882 to mate with the alignment holes 532 of the bottom 530 (FIG. 5) of the STM reactor 200 and to begin raising the reactor 200. The docking scaffold 862 continues to raise the STM reactor 200 until the alignment pins, 218 . . . 222, and the arms 205 of the reactor 200 engage with the mounting frame ring 872, which securely positions the reactor 200 for sample insertion, sample removal, and tip exchange by an operator using the wobble stick 864. The UHV pumping system 865 provides an UHV (ultra high vacuum) within the vacuum chamber 852 surrounding the STM reactor 200, which may be under pressure.

Figure 9:
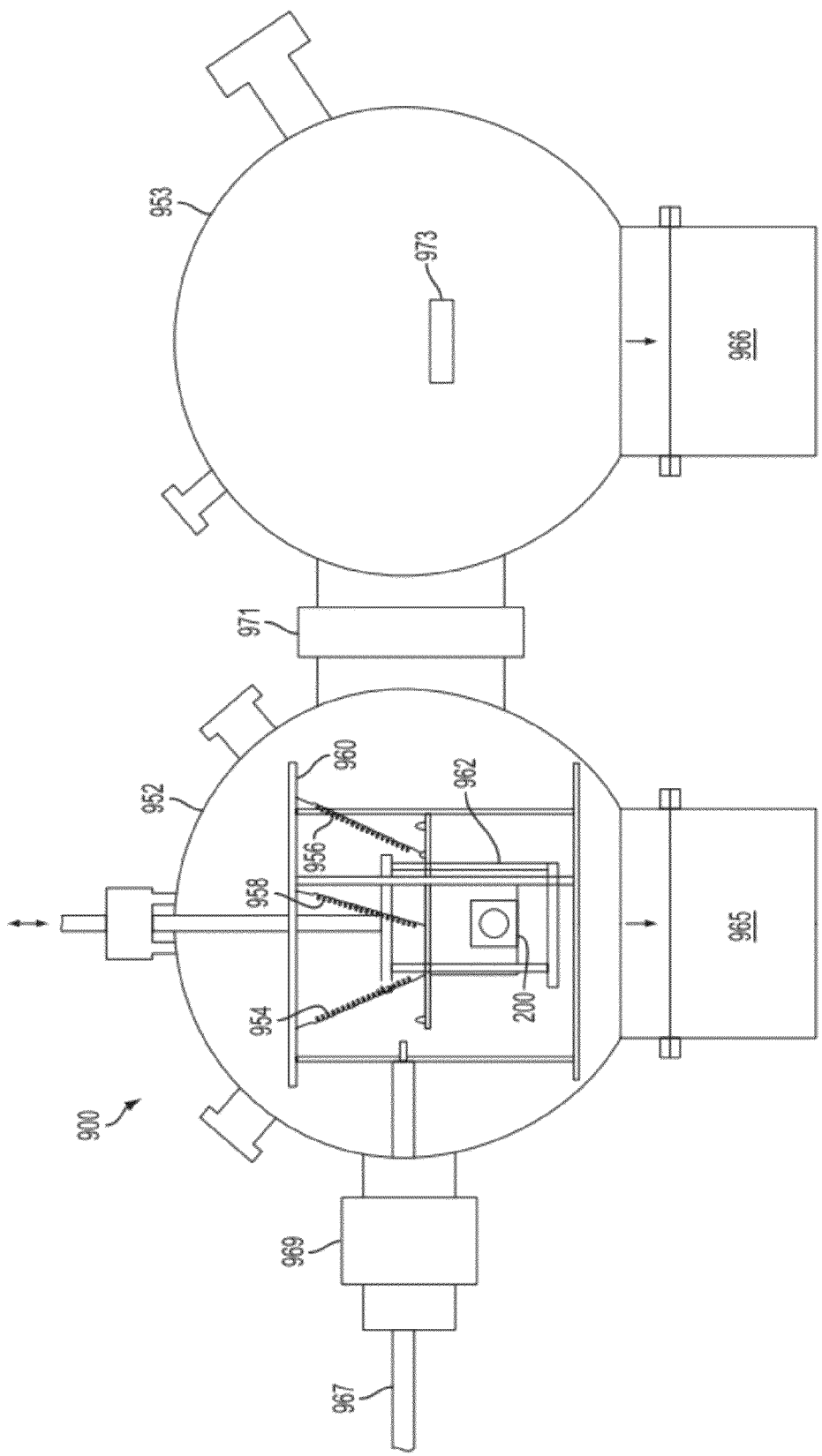
FIG. 9 illustrates another embodiment of an STM system of the present disclosure.

Another embodiment of an STM system of the present invention is illustrated in FIG. 9. The STM system 900 includes an STM vacuum chamber 952, a sample preparation vacuum chamber 953, the STM reactor 200, three springs, 954, 956, and 958, a mounting framework 960, a docking scaffold 962, a wobble stick (e.g. 864, not shown), a sample transfer rod 967, a load lock 969, a gate valve 971, and first and second UHV pumping systems, 965 and 966. The STM vacuum chamber includes the STM reactor 200, the three springs, the mounting framework 960, the docking scaffold 962, and the wobble stick (not shown), which are configured and operate similarly to the components within the STM system 800. The load lock 969 provides a port for loading and removing sample assemblies (not shown) and a tip holder (not shown) into and out of the STM system 900 while maintaining the system 900 under high vacuum. The sample preparation vacuum chamber 953 couples to the STM vacuum chamber 952 by way of the gate valve 971. This allows the sample preparation vacuum chamber 953 to be isolated from the STM vacuum chamber 952 so that gas leaking from the STM reactor 200 during operation does not impact sample preparation activities. The sample preparation vacuum chamber 953 includes a sample preparation stage 973 (e.g., a four finger stage made of alumina that provides thermal isolation) and an Auger electron spectrometer (not shown) for analysis of surface composition of a sample. The sample transfer arm 967 transfers a sample assembly (not shown) that include the sample from the load lock 969 to the sample preparation stage 973, where an Argon ion gun (not shown) may be used to sputter clean a surface of the sample and an electron bombardment gun (not shown) may be used for annealing the sample. The sample transfer arm 967 then transfers the sample assembly to the STM vacuum chamber 952 where the wobble stick is used to transfer the sample assembly from the transfer arm 967 to the STM reactor 200. Upon completion of analysis within the STM reactor 200, the wobble stick is used to transfer the sample assembly from the STM reactor 200 to the transfer arm 967, which can then return the sample assembly to the load lock 969 for removal of the sample assembly from the STM system 900. In an embodiment, the STM vacuum chamber 952 can include a pre-processing stage (not shown) for queuing sample holders prior to sample preparation or between sample preparation and sample processing in the STM reactor 200. The pre-processing stage may also queue one or more tip holders.

It will be readily apparent to one skilled in the art skilled in the art that various modifications may be made to the STM systems, 800 and 900. For example, other arrangements for securing the STM reactor 200 during sample insertion, sample, removal, and tip exchange may be employed which use structures different from the arms 205 of the reactor 200, the mounting framework 860, and the docking scaffold 862. Another such example is replacing the wobble stick 864 and the transfer arm 967 with an automated sample transfer system to provide an STM system with higher throughput.

Figure 10:
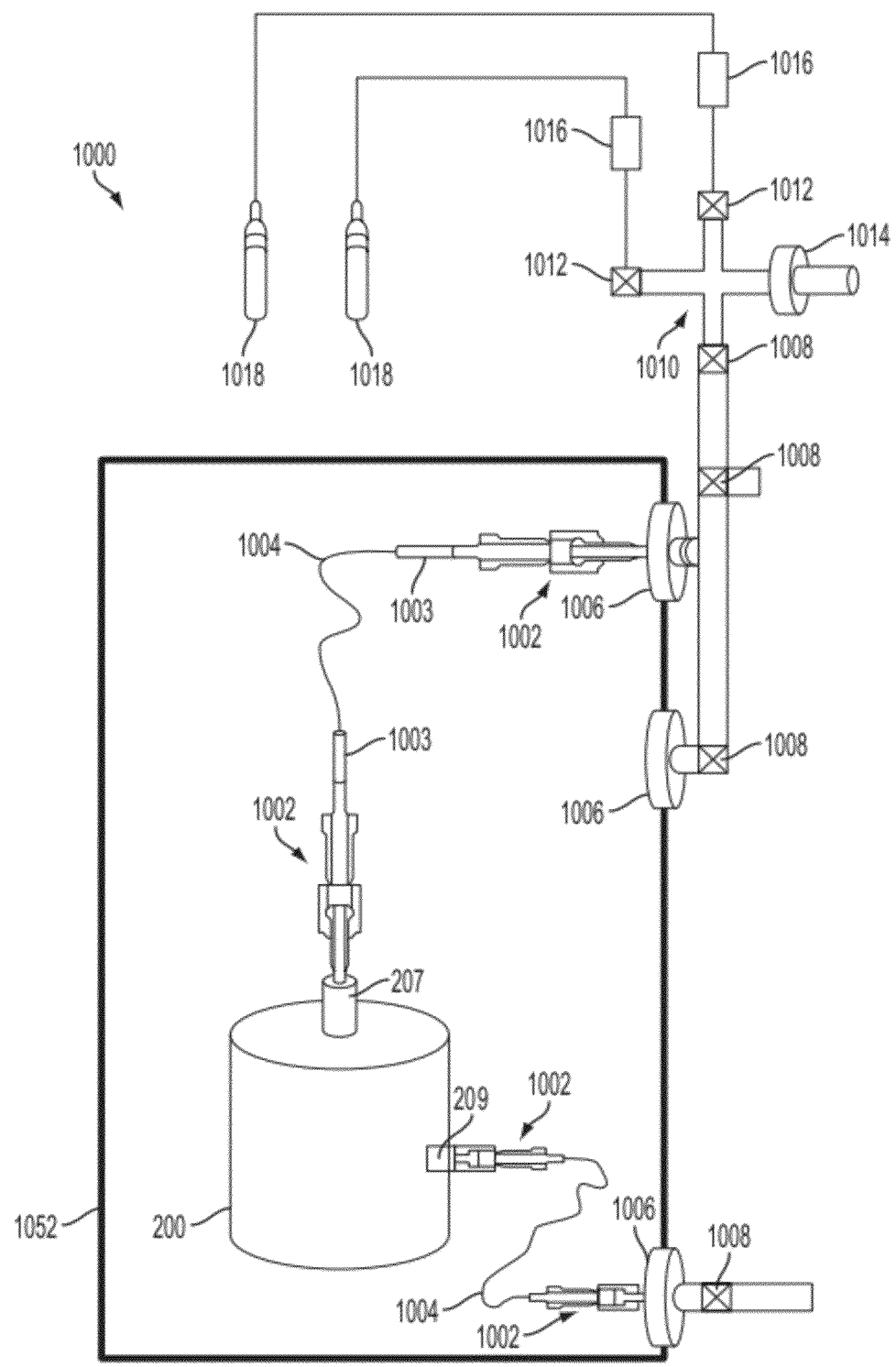
FIG. 10 illustrates an STM reactor, an STM vacuum chamber, and a gas handling system in accordance with an embodiment of the present disclosure.

An embodiment of an STM reactor 200, an STM vacuum chamber 1052, and a gas handling system 1000 of the present invention is illustrated in FIG. 10. The gas handling system 1000 provides gas to a reactor gas inlet 207 of the STM reactor 200 and receives gas from a reactor gas outlet 209 of the reactor 200. The STM reactor 200 is located within STM vacuum chamber 1052. The gas handling system includes couplings 1002 (e.g., Swagelok® couplings), stainless steel tubing 1003 (e.g., silica coated stainless steel tubing, ⅛ in. ID), flexible tubing 1004 (e.g., PEEK tubing, 1/16 in. OD and 1/32 in. ID), vacuum chamber wall feedthroughs 1006 (e.g., double sided conflat (CF) feedthroughs), angle valves 1008, a gas mixing vessel 1010, variable leak valves 1012, a pressure gauge 1014 (e.g., a Baratron® capacitance manometer), gas filters 1016, and gas cylinders 1018, as shown, for example, in FIG. 10.

Figure 11:
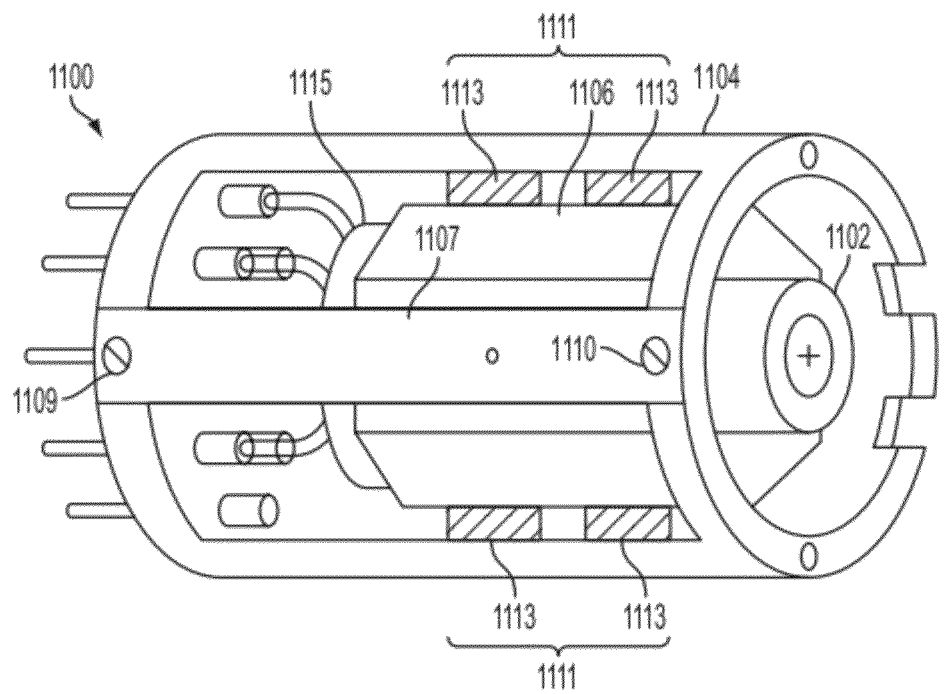
FIG. 11 illustrates an embodiment of an STM assembly of the present disclosure.

An embodiment of an STM assembly of the present invention is illustrated in FIG. 11. The STM assembly 1100 includes a coarse displacement arrangement, a scanning tube, and a receiver 1102. The coarse displacement arrangement includes an STM body 1104, a hexagonal sapphire piece 1106, two piezoelectric shear plate assemblies 1111, a third piezoelectric shear plate assembly (not shown in FIG. 11, but shown in FIG. 12 as a piezoelectric shear plate assembly 1211), and an alumina disk 1115. Each of the shear plate assemblies 1111 and the third shear plate assembly (i.e., piezoelectric shear plate assembly 1211) includes two piezoelectric shear plate stacks 1113. A plate spring 1107 attached to the STM body 1104 by screws 1109 and 1110 presses the shear plate assembly 1211 into the hexagonal sapphire piece 1106 and is adjusted by at least screw 1109 and/or 1110. Increasing the spring force of the plate spring 1107 by tightening the screw 1109 and/or 1110 slows a response speed of the coarse displacement arrangement.

Figure 12:
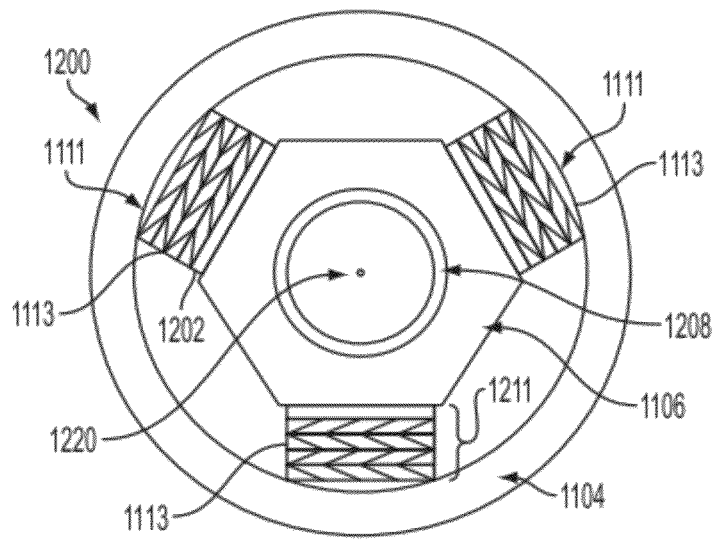
FIG. 12 illustrates a coarse displacement arrangement of an STM assembly in accordance with an embodiment of the present disclosure.

An embodiment of the coarse displacement arrangement and a scanning tube are described with reference to FIGS. 12 and 13. The coarse displacement arrangement 1200 includes the STM body 1104, the hexagonal sapphire piece 1106, and three piezoelectric shear plate assemblies, 1111 and 1211. The piezoelectric shear plate assemblies, 1111 and 1211 each include two piezoelectric shear plate stacks 1113. Each of the piezoelectric shear plate stacks include four alternating interleaved piezoelectric shear plates, i.e., two shear plates 1306 and two shear plates 1307, where shear plates 1306 have a shear polarization opposite to that of shear plates 1307. By applying positive or negative voltages between the first/second pair (i.e., 1306/1307) and between the third/fourth pair (1306/1307) of shear plates 1306, 1307, the shear plate assemblies, 1111 and 1211, cause the hexagonal sapphire piece 1106 to move into an out of the page (FIG. 12). This movement into and out of the page, as shown, is the "coarse" movement of the coarse displacement arrangement 1200, which allows the 1208 to retract from the stage (along a concentric axis 1220 of the coarse displacement arrangement 1200 normal to the page of FIG. 12) for insertion or removal of a sample holder or for exchange of a tip holder.

Figure 13:
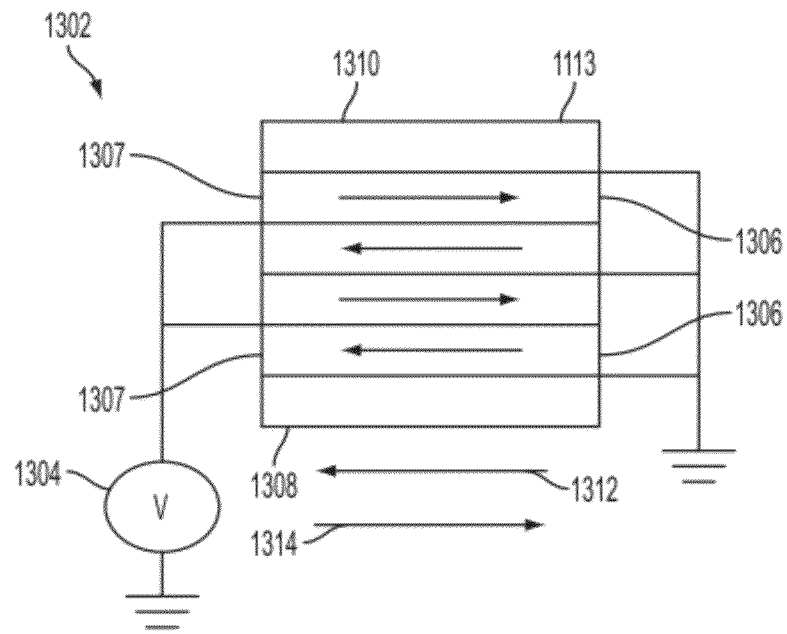
FIG. 13 schematically illustrates a circuit diagram for a piezoelectric shear stack in accordance with an embodiment of the present disclosure.

An embodiment of a shear plate stack 1113 and a control circuit 1302 for the stack 1113 are illustrated in FIG. 13. The control circuit 1302 includes a voltage source 1304. Applying a positive or negative voltage between the first/second and third/fourth piezoelectric shear plates 1306/1307 causes a first edge 1308 of the shear plate stack 1113 to move relative to a second edge 1310 of the stack 1113 in a first or second (opposite) direction, 1312 or 1314 aligned with axis 1220 of the scanning tube 1208 (FIG. 12), where the axis 1220 is indicated in FIG. 12 as pointing out of the page.

Figure 14:
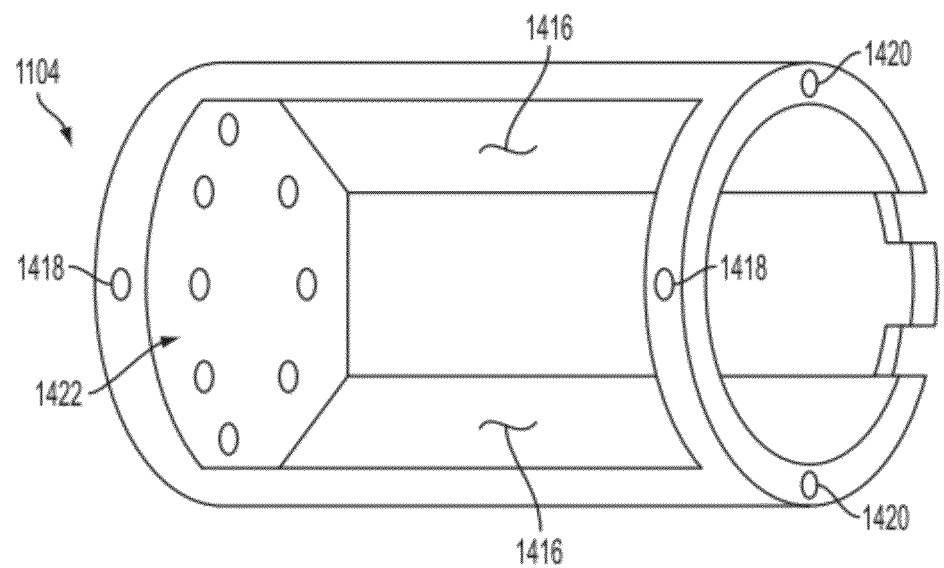
FIG. 14 illustrates an STM assembly in accordance with an embodiment of the present disclosure.

The STM body 1104 is further illustrated in FIG. 14. The STM body 1104 includes first and second flats 1416, first and second pairs of screw holes, 1418 and 1420, and holes 1422 for electrical feedthroughs. The piezoelectric shear plate assemblies 1111 (not shown in FIG. 14) are coupled to the first and second flats 1416, respectively (e.g., by gluing the piezoelectric shear plate assemblies to the first and second flats). The third piezoelectric shear plate assembly 1211 is coupled to the STM body 1204 by the plate spring 1107 (not shown in FIG. 14), which is held in place by the screws 1109, 1110, which mate with the first pair of screw holes 1418. A stage (not shown) for a sample holder (not shown) couples to the second pair of screw holes 1420.

Figure 15:
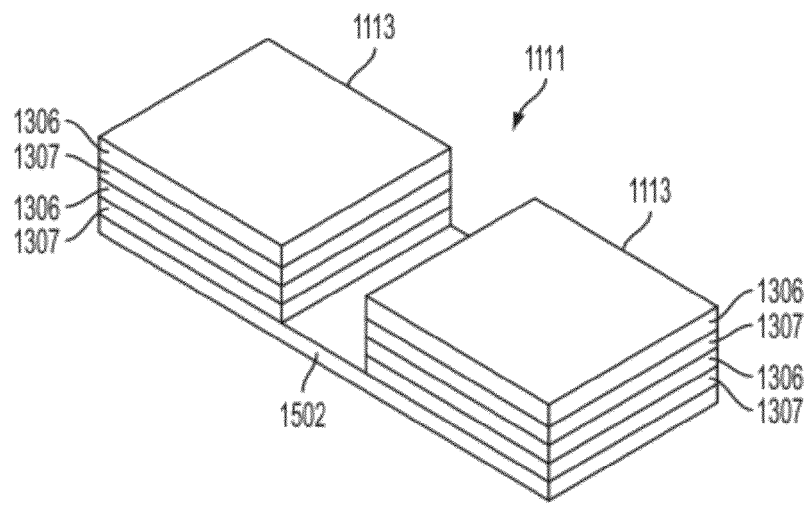
FIG. 15 illustrates a shear plate assembly in accordance with an embodiment of the present disclosure.
Figure 16:
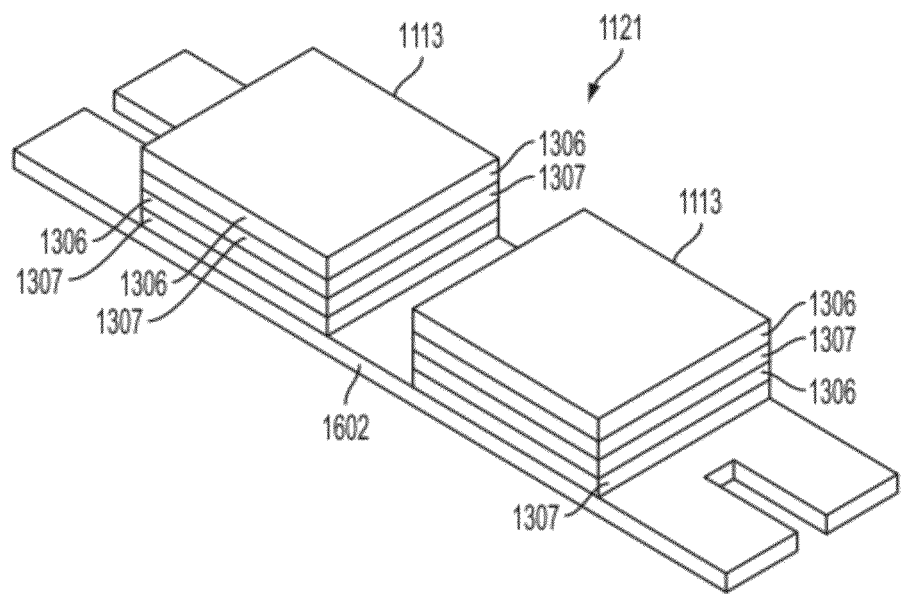
FIG. 16 illustrates another shear plate assembly in accordance with an embodiment of the present disclosure.

FIG. 15 illustrates an embodiment of the piezoelectric shear plate assembly 1111. The piezoelectric shear plate assembly 1111 includes two shear plate stacks 1113, which are coupled to a ceramic piece 1502. The shear plate stacks 1113 include four piezoelectric shear plates comprising alternating polarization shear plates 1306 and 1307. FIG. 16 illustrates an embodiment of the third piezoelectric shear plate assembly 1211, which includes the two shear plate stacks 1113 that are coupled to a ceramic piece 1602.

Figure 17:
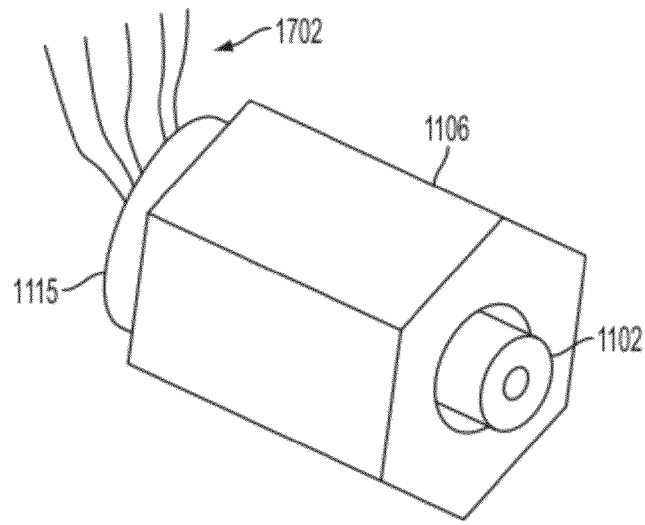
FIG. 17 illustrates a hexagonal sapphire piece, an alumina disk, and a receiver in accordance with an embodiment of the present disclosure.
Figure 18:
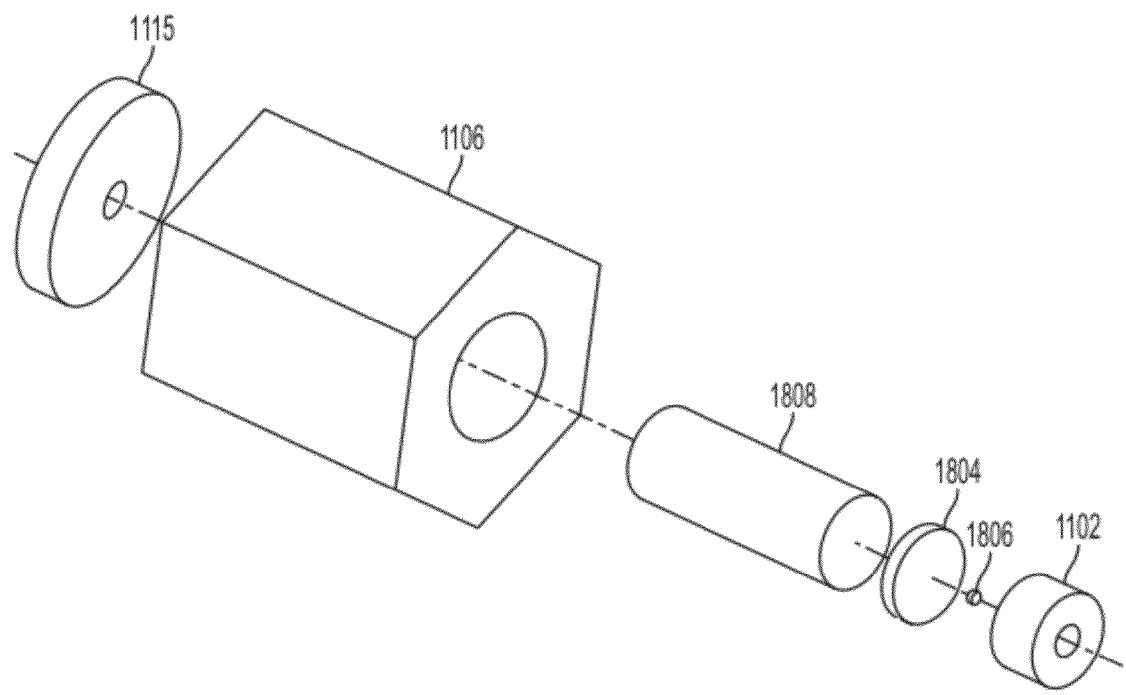
FIG. 18 illustrates an exploded view of a hexagonal sapphire piece, an alumina disk, a scanning tube, a magnet, and a receiver in accordance with an embodiment of the present disclosure.

FIG. 17 illustrates an embodiment of the hexagonal sapphire piece 1106, the alumina disk 1115, and the receiver 1102 as an assembly. In operation, electrical wires 1702 provide signals to the scanning tube 1808 (not shown in FIG. 17) that causes the scanning tube 1808 to scan a tip (described below with reference to FIG. 19) over a sample. FIG. 18 illustrates an embodiment of the hexagonal sapphire piece 1106, the alumina disk 1115, a piezoelectric scanning tube 1808, a second alumina disk 1804, a magnet 1806, and the receiver 1102 in an exploded view. In an embodiment, the magnet 1806 is a SmCo magnet.

Figure 19:
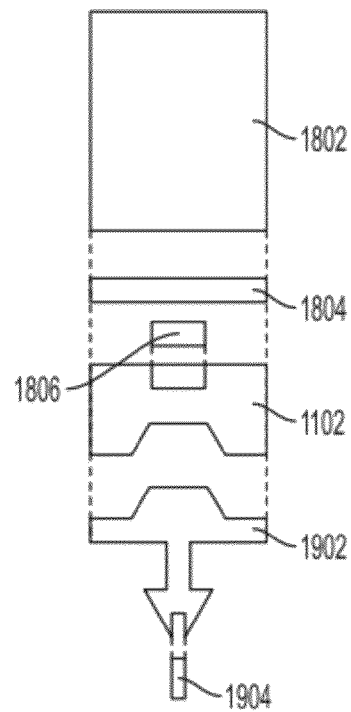
FIG. 19 illustrates a magnet, a receiver, a tip holder, and a tip in accordance with an embodiment of the present disclosure.

FIG. 19 illustrates an embodiment of the scanning tube 1808, the second alumina disk 1804, the magnet 1806, the receiver 1102, a tip holder 1902, and a scanning tip 1904 in a cross-sectional view. The tip holder 1902 magnetically engages with the receiver 1102. In an embodiment, the tip holder 1902 is made of a ferro-magnetic material (e.g., iron). The scanning tip 1904 couples to the tip holder 1902. The choice of tip material depends upon the surface under investigation. For an oxide surface, a Pt or Rh tip may be employed.

Figure 20A:
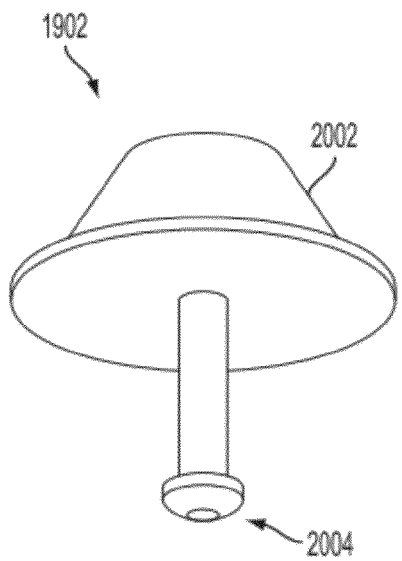
FIGS. 20A and 20B illustrate an embodiment of a tip holder of the present disclosure.
Figure 20B:
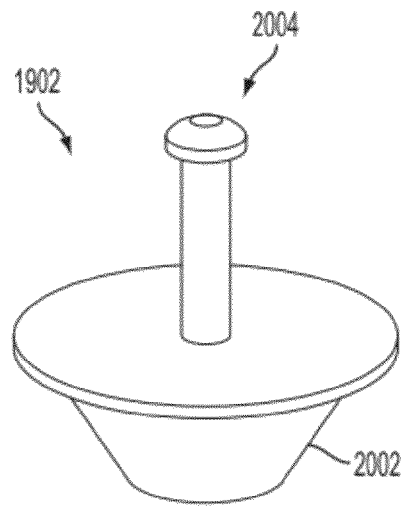

FIGS. 20A and 20B further illustrate an embodiment of the tip holder 1902, which includes a bowl 2002 and a tip cavity 2004. The bowl 2002 mates with the receiver 1102. The tip cavity 2004 receives the scanning tip 1904.

Figure 21A:
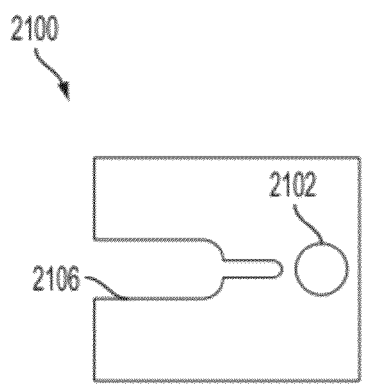
FIGS. 21A and 21B illustrate an embodiment of a tip exchanger of the present disclosure.
Figure 21B:
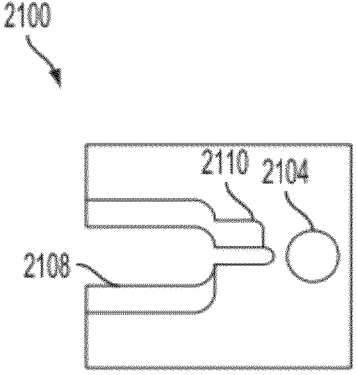

FIGS. 21A and 21B illustrate opposite sides of an embodiment of a tip exchanger 2100, for inserting and removing the tip 1904 from the tip holder 1902. Tip exchanger 2100 includes indentations, 2102 and 2104, a wide slot 2106, and a narrow slot 2108, and a magnet 2110. The indentations 2102 and 2104 allow the tip exchanger 2100 to be picked up by a wobble stick (e.g., wobble stick 864). The wide slot 2106 allows easy mating with the tip holder 1902. The narrow slot 2108 and the magnet 2110 allow the tip holder 2100 to be held securely during transfer, installation, and removal by the wobble stick 864.

The sample preparation vacuum chamber (e.g., 953) is equipped with an Auger electron spectrometer for analysis of surface composition. It is pumped by a sputtering ion pump and a turbomolecular pump with a base pressure of $7 \times 10^{-14}$ bar. Sample cleaning and preparation are carried out by an argon ion gun for sputtering and an electron bombardment gun for annealing. Sample temperature is monitored by using an ex situ infrared thermometer (pyrometer). During cleaning, a sample holder is placed in a four-finger sample stage (e.g., 973) fabricated out of alumina for thermal isolation. The sample can be heated to 1000° C. with an increase in background pressure less than $2 \times 10^{-12}$ bar. The four-finger sample stage 973 matches a three-finger stainless steel fork transfer arm on a transfer rod 967 allowing the sample holder to be transferred to the STM chamber after sample preparation. The sample holder (not shown) and tip exchanger 2100 on a wobble stick (e.g., wobble stick 864) were designed for engaging with the sample stage 973, storage slots on a sample docking disk, and sample stage 314 in the high pressure reactor 200 for rapid transfer of samples and tips 1904.

The STM vacuum chamber (e.g., 952) is also a stainless steel chamber pumped by its own sputtering ion pump and turbomolecular pump. It has a base pressure of $1.2 \times 10^{-13}$ bar. This chamber is separated from the sample preparation chamber by an 8 in. gate valve (e.g., 971). A quadrupole mass spectrometer (not shown) may be installed in this chamber for monitoring reactants and products leaked from Kalrez® o-rings of the high pressure STM reactor system 200 during STM scanning The STM chamber (e.g., 852, 942) contains the high pressure STM reactor 200, a docking scaffold assembled on a custom-designed sample manipulator 886, and a wobble stick (e.g., 864) for sample and/or STM tip (e.g., tip 1904) transfer between the transfer rod on the transfer arm 967, high pressure STM reactor, and lower plate 874.

The sample heating system 600 is located outside the high pressure STM reactor 200 to avoid heating elements in the high pressure environment. It includes a halogen lamp 638 with an elliptical reflector 640 that focuses the radiation onto the sample through a sapphire window (e.g., 536, 636) welded at the bottom of the STM reactor 200 (FIG. 5). The distance between the lamp and the STM reactor 200 can be adjusted to focus the light on the back of the sample for efficient heating. The heating rate can be controlled by adjusting the power supplied to the lamp.

The high pressure STM reactor 200 is a special vessel designed for assembling the STM assembly (e.g., 204, 1100) and sample, and providing a high pressure environment of reactant gases. It houses an STM assembly 1100. A sample assembly stage is mounted at the end of the STM assembly 1100. The sample is thermally isolated and electrically insulated from the STM assembly 1100. FIG. 2 illustrates the high pressure reactor 200, which has a free volume of ~15-19 cm³. The reactor 200 includes cell lid (e.g., 230), vessel neck 244, upper body portion 240, and lower body portion 242. The cell lid 230 has a set of precisely designed holes to glue a set of pin-sockets 246 (FIG. 7) for assembling a set of external pin contacts (e.g., 748) from a docking scaffold (e.g., 862) and a set of internal pin contacts (e.g., 750) for the wiring connections from the shear piezoelectric plates and the scanning tube. These pin-socket contacts provide convenient detachable wiring connections for the high pressure reactor. The external pin contacts 748 from the docking scaffold can be inserted to the vacuum side of the interfacial contacts glued on the cell lid 230. Another set of pin contacts is glued on a set of holes of the STM assembly which have the same size and arrangement as the holes on the lid. This pin-socket wiring structure makes dismantling and assembling the STM convenient when maintenance is required on the high pressure reactor and STM assembly.

For sample transfer and tip change, the port 208 is opened on a side-wall of the high pressure STM reactor 200. The sapphire window (e.g., 536, 636) is welded at the center of the bottom of the reactor to transmit light to heat the sample. Recesses are fabricated on the vessel neck, upper body portion, lower body portion, and port of the reactor 200, for retaining o-rings (e.g., Kalrez®), forming gas-tight seals. The sealing with Kalrez® o-rings allows pressurization of the STM reactor 200 while maintaining a high vacuum in the surrounding chamber. All four sections of the reactor are assembled together by four venting screws and sealed by these o-rings. A bayonet seal 424 seals the port on the reactor 200. The reactor 200 was plated with a layer of gold (thickness: 5/m) to avoid possible reactions between the materials of the high pressure reactor and reactant gas.

FIG. 10 illustrates the gas introduction system for the high pressure reactor. This design isolates the reactant gases in the high pressure reactor from the vacuum environment of the STM chamber. The high pressure gases in the reactor can be quickly pumped down by a turbomolecular pump to obtain a UHV environment after completion of a high pressure experiment. Thus, this high pressure reaction system can work under both UHV and high pressure, offering the capability of studying catalysts over a wide pressure range from $1.2 \times 10^{-13}$ to several bars. In addition, the reactions can be carried out with batch or flowing mode.

II C. STM Assembly and Sample Heating

The STM assembly 1100 fits within the high pressure reactor 200. As mentioned above, it is screwed onto the vessel neck 244. The STM assembly 204 includes a coarse displacement arrangement, a scanning tube, a receiver of the tip holder, and wire connections to these parts. The coarse approach is carried out by six sets of shear piezoelectric plates located between a hexagonal sapphire piece and an STM body. One side of each shear piezoelectric set is glued on the internal wall of the STM body while the other end contacts the surface of the hexagonal sapphire piece. By applying negative or positive voltages to the first/second and the third/fourth pairs of piezoelectric plates 1306/1307, respectively, the lateral force moves the hexagonal sapphire piece 1106 forward and backward. A single piezoelectric scanning tube 1802 is glued to an alumina disk 1115 which is, in turn, glued to one end of the hexagonal sapphire piece 1106. Five Kapton® wires are glued to five components (+x,−x,+y,−y, and z fine motion) of the scanning tube through holes on the alumina disk. Another alumina disk 1804 is glued to the other end of the scanning tube 1802 onto which a small SmCo magnet 1806 and a bowl-shaped tip receiver is glued (FIG. 17). The central part of the receiver of the tip holder is a SmCo magnet. The tip exchange mechanism, which holds the tip, is described below. A flexible coaxial wire is glued to this tip receiver for transmitting the tunneling current from the tip.

At the front of the STM body one CuBe plate spring 1107 (FIG. 11) is used to hold two sets of shear piezoelectric plate stacks 1113 (i.e. a piezoelectric shear plate assembly). The pressure applied to the hexagonal sapphire by the shear piezoelectric sets can be fine tuned by a screw in the plate spring. This pressure can change the speed of the coarse approach. A K-type thermocouple is spot welded to the sample stage for both sample bias and temperature measurements. A second thermocouple is attached to the STM body to monitor the temperature of the shear piezoelectric plates during sample heating and reaction at high temperature. Thus, thermal diffusion and possible increases in the temperature of the STM assembly can be simultaneously monitored when the sample in the high pressure reactor is heated.

A sample assembly stage is screwed to the end of the STM body, which is thermally and electrically insulated from it by three precisely aligned sapphire balls and insulating washers. Experiments show that the shear piezoelectric plates, scanning tube, and SmCo magnet do not degrade when the sample is at a temperature of 700° K. and the pressure of reactant gases is 1 bar.

II D. Sample Transfer and Tip Change

The sample transfer between STM chamber and sample preparation chamber is carried out by a magnetic transfer rod with a three-finger fork. A wobble stick can transfer the sample and tip between the three-finger fork, the high pressure reactor, and the slots in the sample docking disk. It can accept and release the sample holder conveniently. In addition, the sample holder and tip exchanger can be introduced or re-moved from the system through a load-lock system.

Replacement of the STM tip is accomplished by a magnetic tip exchanger with the same geometry as a sample assembly, which allows use of the transfer arm and wobble stick for movement of the tip exchanger, and that engages the tip holder. The tip exchanger with the tip holder can be easily transferred to and from the high pressure reactor, the storage disk, and the load-lock system.

III. Performance

The performance of the instrument described above is illustrated with two examples of experiments carried out under UHV and high pressure conditions. These include highly ordered pyrolytic graphite (HOPG) and hex-Pt(100) single crystal. In Sec. III A, the results of a clean HOPG surface and a self-assembled organic monolayer on HOPG under ambient and UHV conditions are described. In Sec. III B, STM images of a clean hex-Pt (100) surface with atomic resolution are presented along with the roughening of the surface upon reaction with high pressure CO.

Figure 22A:
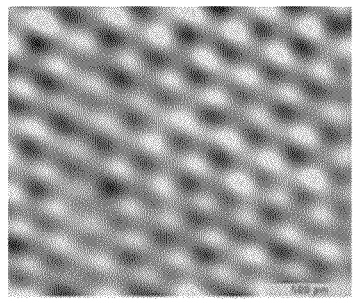
FIG. 22: (a) STM image of a clean HOPG surface. (b) STM image of a self-assembled monolayer of hexadecanedioic acid deposited on HOPG under an environment of 1 bar nitrogen; the bottom is a molecular structure of hexadecanedioic acid.

III A. Clean HOPG and Self-Assembled Monolayer on HOPG Under Both Ambient and UHV Conditions Atomically resolved images can be routinely obtained on HOPG samples, both under UHV and in ambient condition at a tunneling current of 1.0-2.0 nA and sample bias of 0.1-0.5 V [FIG. 22(a)].

Figure 22B:
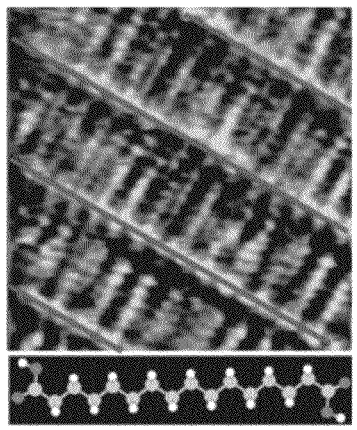

To test the behavior of the STM assembly under high pressure conditions, a HOPG sample deposited with a self-assembled monolayer of hexadecanedioic acid is assembled in the reactor. Then, 1 bar nitrogen was introduced into the reactor while the STM chamber is pumped down to high vacuum. Images of the self-assembled monolayer with atomic resolution, as shown in FIG. 22(b), can be obtained under an environment of 1 bar nitrogen. This image has five lamellae. Each lamella in terms of the section between two adjacent blue lines consists of parallel packed molecule. Similar to the self-assembly of other carboxylic acids on HOPG, the ordered self-assembled structure is formed through intermolecular hydrogen bonds between two adjacent lamellae. This demonstrates the satisfactory performance of the STM assembly and high pressure reactor.

III B. Reactive Surfaces and CO Induced Roughness Under High Pressure

Figure 23A:
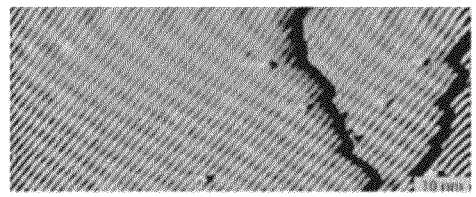
FIG. 23: (a) Large-size STM image of a clean surface of hex-Pt(100) with step height of single atom (2.1 Å) collected under UHV condition at 300 K. (b) Small-size atom-resolved image of this surface under UHV.
Figure 23B:
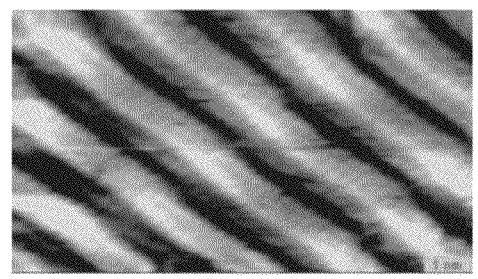
Figure 24:
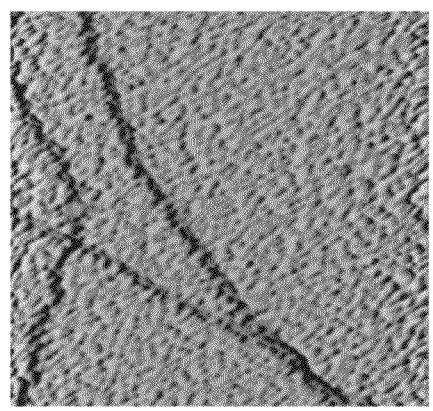
FIG. 24: STM image of a highly roughed Pt(100) formed in an environment of 0.9 bar CO.

CO oxidation is an extremely important industrial catalytic process. Platinum is an active catalyst for this reaction. Here hex-Pt (100) is selected as a highly reactive surface. The CO adsorption on hex-Pt (100) under a wide range of CO pressures was studied with this instrument. As is well known, the top layer of a clean hex-Pt (100) is a quasi-hexagonal layer with 20% extra Pt atoms in contrast to the underlying layer with a 1×1 structure. The clean hex-Pt (100) was prepared by the procedure reported in literature (e.g., see K. Mase et al., *Surf. Sci.* 277, 97 (1992)). After it is cleaned by a combined $Ar^+$ sputtering, annealing in oxygen environment, and a final annealing to 1150 K for several minutes in UHV followed by a slow cooling to room temperature, a clean hexagonal-Pt <100> surface is formed (FIGS. 23(a) and 23(b), shown at different magnification). The STM produces images of the clean hex-Pt <100> with atomic resolution at room temperature (FIG. 23(b)), which demonstrates the reliability of the STM assembly, sample heating, sample sputtering, sample transfer, and tip exchange mechanism of this system. Upon exposure to an environment of 0.9 bar CO, the clean hex-Pt (100) restructures significantly and presents as a surface covered with clusters with sizes ranging from 2 to 5 nm. FIG. 24 is one image of the highly roughed surface formed in an environment of high pressure CO.

In conclusion, a new high pressure and high-temperature STM reactor was designed and built with the purpose of simulating industrial catalysis reaction conditions. The STM assembly is housed in a high pressure reactor equipped with in situ heating and fast sample transfer and tip change. Performance of this instrument has been demonstrated and described with examples that include HOPG, both clean and with adsorbed hexadecanedioic acid. Results have been demonstrated of CO induced reconstruction of hex-Pt (100) over a wide range of CO pressures, demonstrating the capability of studying catalytic reactions at atomic resolution in a high pressure environment. It may be appreciated that this STM can serve as an important tool in the effort to overcome the pressure gap of catalysis studies and for surface science studies at a condition of high pressure.

REFERENCES

1. B. J. McIntyre, M. Salmeron, and G. A. Somorjai, *Rev. Sci. Instrum.* 64, 687 (1993).
2. J. A. Jensen, K. B. Rider, Y. Chen, M. Salmeron, and G. A. Somorjai, *J. Vac. Sci. Technol. B* 17, 1080 (1999).
3. P. B. Rasmussen, B. L. M. Hendriksen, H. Zeijlemaker, H. G. Ficke, and J. W. M. Frenken, *Rev. Sci. Instrum.* 69, 3879 (1998).

4. E. Laegsgaard, L. Osterlund, P. Thostrup, P. B. Rasmussen, I. Stensgaard, and F. Besenbacher, *Rev. Sci. Instrum.* 72, 3537 (2001).
5. A. Kolmakov and D. W. Goodman, *Rev. Sci. Instrum.* 74, 2444 (2003).
6. M. Röβler, P. Geng, and J. Wintterlin, *Rev. Sci. Instrum.* 76, 023705 (2005).
7. K. Mase and Y. Murata, *Surf Sci.* 277, 97 (1992).

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A scanning tunneling microscope (STM) reactor comprising:
a pressure vessel including a sealable port, a volume of the pressure vessel being less than about 100 cm$^3$, the pressure vessel configured to maintain a pressure of about $10^{-13}$ bars to 20 bars;
three arms attached to an exterior of the pressure vessel, the three arms extending outward from the pressure vessel;
three coupling objects coupled to the exterior of the pressure vessel and configured to suspend the pressure vessel by three springs, a first coupling object, a second coupling object, and a third coupling object of the three coupling objects being attached to a first arm, a second arm, and a third arm of the three arms, respectively; and
a STM assembly coupled to an interior of the pressure vessel, the STM assembly configured to perform scanning tunneling microscopy.

2. The STM reactor of claim 1 wherein the three coupling objects are selected from a group consisting of eyes, hooks, and loops.

3. The STM reactor of claim 1 further comprising:
a stage configured to receive a sample holder.

4. The STM reactor of claim 1 wherein the volume of the pressure vessel is less than about 50 cm$^3$.

5. The STM reactor of claim 1 wherein the volume of the pressure vessel is less than about 25 cm$^3$.

6. The STM reactor of claim 1 wherein the exterior of the pressure vessel comprises alignment holes configured to engage with a docking scaffold.

7. The STM reactor of claim 1 wherein the three arms comprise alignment pins configured to mate with a mounting framework.

8. The STM reactor of claim 1 wherein the pressure vessel comprises a lid and a pressure vessel body.

9. The STM reactor of claim 8 wherein the lid comprises a plurality of pin-sockets configured to provide electrical connections to the STM assembly.

10. The STM reactor of claim 9 wherein each pin-socket of the plurality of pin-sockets comprises a first and a second socket, wherein the first socket is configured to receive a first pin from outside the pressure vessel, wherein the second socket is configured to mate with a second pin, and wherein the second pin is electrically coupled to the STM assembly.

11. The STM reactor of claim 8 wherein the pressure vessel body comprises a cylindrical portion and a bottom, and wherein the sealable port is positioned in the cylindrical portion proximate the bottom.

12. The STM reactor of claim 1 wherein the STM assembly comprises:
a coarse displacement arrangement;
a fine displacement scanning tube coupled to the coarse displacement arrangement; and
a receiver coupled to the scanning tube, wherein the receiver is configured to receive a tip holder, and wherein the tip holder is configured to receive a tip.

13. The STM reactor of claim 12 wherein the coarse displacement arrangement comprises a STM body, six sets of piezoelectric shear plate stacks coupled to the STM body, and a hexagonal sapphire piece coupled to the six sets of piezoelectric shear plate stacks.

14. The STM reactor of claim 12 wherein the receiver comprises a magnetic receiver configured to magnetically hold the tip holder.

15. A scanning tunneling microscope (STM) reactor comprising:
a pressure vessel including a sealable port, a volume of the pressure vessel being less than about 100 cm$^3$, the pressure vessel configured to maintain a pressure of about $10^{-13}$ bars to 20 bars;
three coupling objects coupled to an exterior of the pressure vessel and configured to suspend the pressure vessel by three springs; and
a STM assembly coupled to an interior of the pressure vessel, the STM assembly configured to perform scanning tunneling microscopy, the STM assembly comprising:
a coarse displacement arrangement comprising a STM body, six sets of piezoelectric shear plate stacks coupled to the STM body, and a hexagonal sapphire piece coupled to the six sets of piezoelectric shear plate stacks;
a fine displacement scanning tube coupled to the coarse displacement arrangement; and
a receiver coupled to the scanning tube, the receiver being configured to receive a tip holder, and the tip holder being configured to receive a tip.

16. The STM reactor of claim 15 wherein the three coupling objects are selected from a group consisting of eyes, hooks, and loops.

17. The STM reactor of claim 15 further comprising:
a stage configured to receive a sample holder.

18. The STM reactor of claim 15 wherein the volume of the pressure vessel is less than about 50 cm$^3$.

19. The STM reactor of claim 15 wherein the volume of the pressure vessel is less than about 25 cm$^3$.

20. The STM reactor of claim 15 wherein the exterior of the pressure vessel comprises alignment holes configured to engage with a docking scaffold.

21. The STM reactor of claim 15 further comprising:
three arms attached to the exterior of the pressure vessel, wherein the three arms extend outward from the pressure vessel.

22. The STM reactor of claim 21 wherein the three arms comprise alignment pins configured to mate with a mounting framework.

23. The STM reactor of claim 21 wherein a first coupling object, a second coupling object, and a third coupling object of the three coupling objects are attached to a first arm, a second arm, and a third arm of the three arms, respectively.

24. The STM reactor of claim 15 wherein the pressure vessel comprises a lid and a pressure vessel body.

25. The STM reactor of claim 24 wherein the lid comprises a plurality of pin-sockets configured to provide electrical connections to the STM assembly.

26. The STM reactor of claim 25 wherein each pin-socket of the plurality of pin-sockets comprises a first and a second socket, wherein the first socket is configured to receive a first pin from outside the pressure vessel, wherein the second socket is configured to mate with a second pin, and wherein the second pin is electrically coupled to the STM assembly.

27. The STM reactor of claim 25 wherein the pressure vessel body comprises a cylindrical portion and a bottom, and wherein the sealable port is positioned in the cylindrical portion proximate the bottom.

28. The STM reactor of claim 15 wherein the receiver comprises a magnetic receiver configured to magnetically hold the tip holder.

* * * * *